July 17, 1951        C. E. WEEKS        2,561,002
TRACTOR MOUNTED BROADCAST SEEDER
Filed Aug. 20, 1947        2 Sheets—Sheet 1
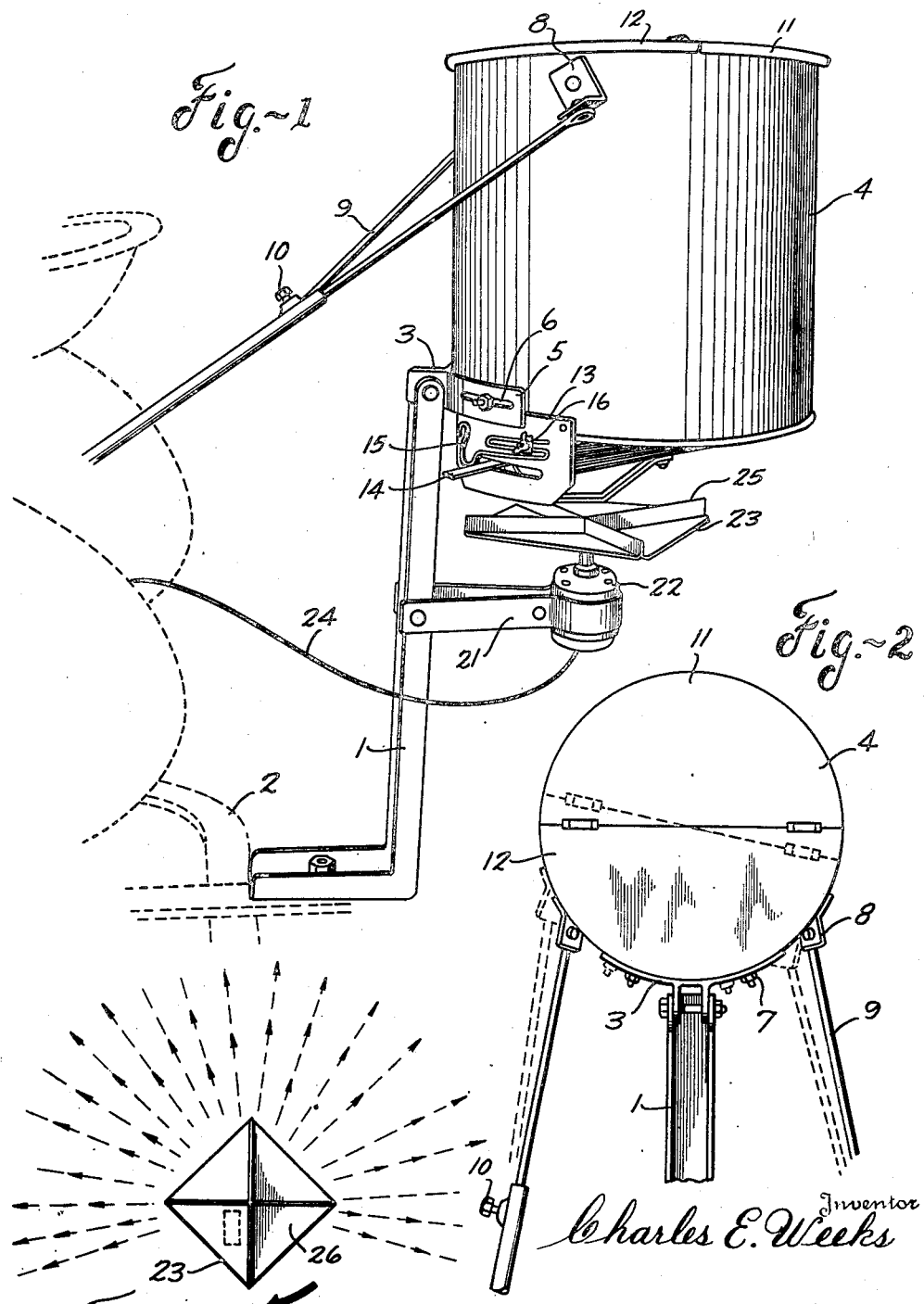
Inventor
Charles E. Weeks
By Tom Walker
Attorney Patented July 17, 1951

2,561,002

UNITED STATES PATENT OFFICE 2,561,002

TRACTOR-MOUNTED BROADCAST SEEDER

Charles E. Weeks, Union, Ohio

Application August 20, 1947, Serial No. 769,699

3 Claims. (Cl. 275—8)

This invention relates to power operated farm equipment, and more particularly to a power operated seeding device of the broadcast type which may be attached to a tractor or other type of power vehicle.

While there are many types of mechanized seeding devices for specialized work and particular types of crops, there have been relatively few power seeders of the broadcast type. Power operated seeders of this type have heretofore been considered impractical, since seed was distributed throughout a full 360 degree angular movement. When such devices were attached to tractors or other power vehicles, considerable seed was wasted by deposit upon parts of the tractor or other supporting vehicle.

The present invention when embodied in power seeders of the broadcast type completely eliminates this waste of seed and in addition does a more thorough job of seeding in much less time.

Thus, the object of the present invention is to improve the construction as well as the means and mode of operation of power operated seeders of the broadcast type, whereby they may not only be economically manufactured, but will be more efficient in use, convenient in operation, uniform in action, embodying a minimum number of parts, and be unlikely to get out of repair.

A further object of the invention is to provide a power operated seeder of the present type which is universally adaptable for mounting upon power vehicles of various types.

A further object of the invention is to provide a seeder of the type herein disclosed which may be so adjusted as to properly distribute seeds of various characters.

A further object of the invention is to provide in a seeder of the type herein disclosed a means for controlling the area within which the seed is distributed, and to limit such area to less than 360 degrees of angular motion.

A further object of the invention is to provide a seeder of the present type which may be either mechanically actuated by the operation of the power vehicle, or electrically operated by an individual electric motor.

A further object of the invention is to provide a device of the character described possessing the advantageous structural features, the inherent meritorious characteristics and the mode of operation herein described, or their equivalents.

With the above primary and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

In the accompanying drawings, wherein is shown the preferred but obviously not the only form of embodiment of the invention, Fig. 1 is a perspective view of a broadcast seeder embodying the present invention when secured to a tractor.

Fig. 2 is a top view of the seeder, the angular adjustment thereof being shown in dotted lines.

Fig. 3 is a diagrammatic view showing the approximate angle of seed distribution.

Like parts are indicated by similar characters of reference throughout the several views.

Figure 4:
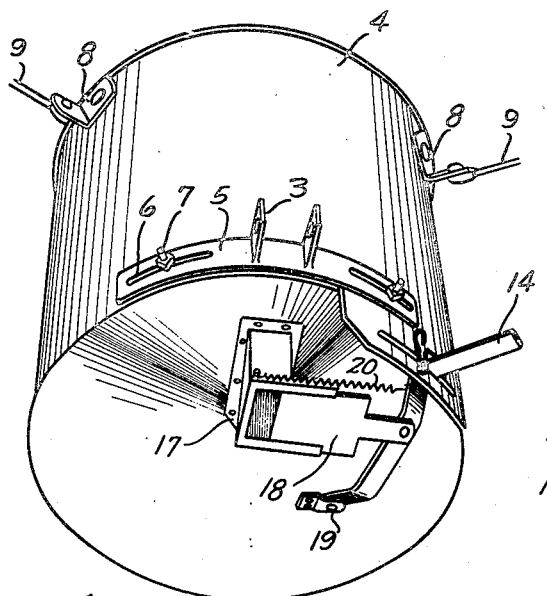
Fig. 4 is a perspective view showing the bottom of the hopper and the discharge regulating valve.

Referring to the drawings, the seeder is supported upon a bracket 1 which is removably secured to the draw bar 2 of a tractor. To the upper end of the bracket 1 a yoke or mounting member 3 is secured, upon which a seed hopper 4 is adjustably supported. The laterally projecting arms 5 of the yoke have therein elongated slots 6 through which project bolts 7 which are integrally united with the hopper 4. This permits rotation of the hopper 4 relative to the mounting member and associated supporting bracket within the limits of the elongated slots 6.

Pivotally secured to the hopper adjacent the top thereof are a pair of angle members 8 to which one end of longitudinally extensible and contractible tie rods 9 are also pivotally secured. The opposite ends of the tie rods are fastened to some convenient portion of the tractor. The entire unit is thereby solidly supported upon the tractor, yet supported in such a manner that the hopper is capable of limited rotation relative to its mountings, as is shown in dotted line in Fig. 2.

To rotate the hopper the bolts 7 are loosened and also the lock screws 10 in the tie rods 9. The distortion of the tie rods incident to rotation of the hopper is fully compensated by pivotal movement of the angle members 8 relative to the hopper, and the combined expansion, contraction and pivotal movement of the tie rods 9 relative to the angle members 8 and the hopper.

A cover portion 11 is secured to the hopper, the cooperating portion 12 being pivotally united thereto to permit ready access to the interior of the hopper.

Extending downwardly on one side of the hopper is a slotted guide plate 13, through which projects the discharge valve control lever 14. An adjustable stop member 15 is frictionally engaged with the guide plate by means of the clamp screw 16, the positioning of which determines the size of opening of the hopper discharge valve.

As is more clearly shown in Fig. 4, the discharge conduit 17 is located on a diametric plane of the hopper bottom, but radially offset from the center of the hopper. The bottom of the hopper is so contoured that the contents thereof will fall by gravity to the discharge conduit. Controlling the seed discharge therefrom is a gate valve 18 which has to and fro sliding motion across the conduit 17. Movement of the valve plate 18 is controlled by the lever 14 pivotally secured to the bottom of the drum at 19. The valve plate 18 is normally urged toward closed position under influence of the retractile spring 20.

Thus, the lever 14 is constantly maintained in contact with the stop member 15 under tension of the spring 20. The size of the discharge opening is therefore determined by the location of the stop member 15 relative to the plate 13 upon which it is mounted. By lifting the stop member 15 out of the path of the lever 14, the valve is permitted to close under influence of the spring 20.

Projecting laterally from the mounting bracket 1, immediately beneath the hopper 4 is a distributor supporting arm 21. Mounted on this arm is an electric motor 22, on the rotor shaft of which is supported the distributor fan 23. The motor is energized from the electrical system of the tractor through the conductor 24. The other side of the motor circuit is grounded on the arm 21, as is common in automotive practice.

The distributor fan 23 is slightly concave and has thereon a plurality of upstanding ribs 25. There is thus formed a series of sectors 26, the bottoms of which are slightly inclined, the periphery of the fan being slightly higher than the center thereof.

The distributor 23 is so positioned in relation to the hopper 4 that the discharge conduit 17 is eccentrically located in relation to the center of the distributor. Such arrangement permits the discharge of seed from the hopper into the individual sectors 26 successively, rather than being centrally discharged upon the distributor into all compartments simultaneously. The seed discharged from the hopper onto the distributor travels outwardly and upwardly thereon under the influence of centrifugal force created by the rotation of the distributor.

A definite period of time is required for the seed to travel to the outer periphery of the distributor, during which time the particular sector 26 onto which the seed has been discharged has had sufficient angular displacement to permit the radial discharge of the seed therefrom in a line which clears the rearmost portions of the tractor or other vehicle upon which the seeder is mounted. This is diagrammatically shown in Fig. 3, wherein seed distribution is shown throughout approximately 200 degrees of angular movement.

The particular sector 26 into which seed has been previously discharged from the hopper has been emptied by the time it again approaches the rear of the vehicle, and is ready to receive a second charge of seed as it passes beneath the discharge conduit 17.

The relationship of the discharge conduit 17 and the distributor 23 must be varied for efficient sowing of diffeernt seeds. Since different seeds are of different weight, the reaction of centrifugal influence thereon varies considerably. This variation in reaction is utilized to control the operation of the seeder in the distribution of differing seeds.

Rotation of the hopper 4 relative to its mounting yoke 3 varies the point of discharge in relation to distributor. In other words, the position of the sector 26 at the time of receiving the seed from the discharge conduit 17 controls the operation of the seeder, in that it determines the point of seed discharge from the distributor. If the seed being sown is one that does not quickly react to centrifugal force, the seed is placed on the distributor sector while the sector is still traveling toward the bracket 1. If, however, the seed is one that quickly responds to centrifugal influence, it is not placed upon the distributor until after the sector has passed the bracket 1, and is moving away therefrom. Thus, by rotation of the hopper on its mounting yoke 3, the time necessary for the seed to travel to the periphery of the distributor after deposit thereon may be provided. In this way, the seed is discharged from the distributor at substantially the same point in its rotation, regardless of the type of seed being sown.

The position of the valve plate 18 is also varied in relation to the type of seed being sown and the desired thickness of seeding. If the seeding is to be relatively heavy, the valve is opened further, thereby permitting a greater quantity of seed to drop upon the distributor. Should the operator desire a relatively light seeding, however, the valve is moved toward its closed position, thereby reducing the quantity of seed deposited upon the distributor. This setting is regulated as desired by movement of the stop member 15 against which the valve control lever 14 rests under influence of the retracting spring 20.

While a broadcast seeder of the type shown herein embodying the present invention is relatively simple and has few operating parts, it has been found most practical and efficient in use. The many disadvantages of former seeders have been apparently completely overcome by the present construction.

Some operators may desire to drive the distributor mechanically rather than by the individual electric motor. The present unit is quite adaptable to such modification, two forms of which are shown in Figs. 5 and 6, respectively.

Figure 5:
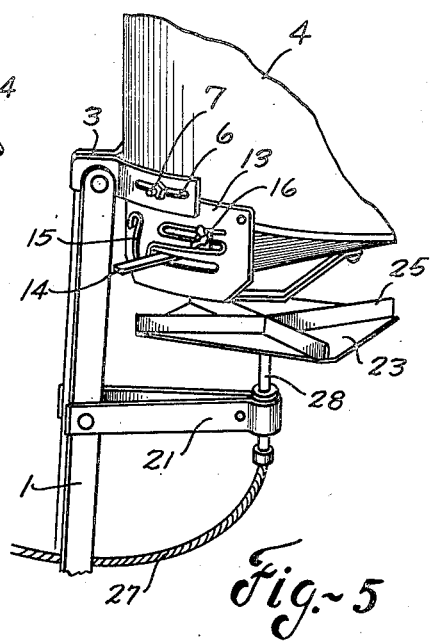
Fig. 5 shows a modified seeder utilizing a power take-off shaft of the tractor to provide motive power of the distributor.

In Fig. 5 is shown a structure identical with that shown in Fig. 1, except that the distributor 23 is driven by means of a flexible shaft 27 connected to a convenient source of power on the tractor. A short shaft 28 is journaled in the distributor supporting arm 21 in place of the electric motor, the flexible shaft being secured to one end thereof and the distributor mounted upon the other end thereof.

Figure 6:
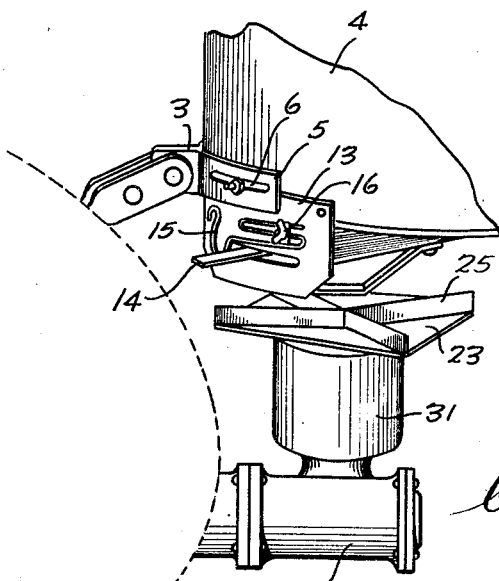
Fig. 6 is a further modification of the power supply means for the distributor.

Fig. 6 discloses another form of power supply means for the distributor. Certain tractors have auxiliary power take-off units 30 mounted on the rear thereof. A pulley 31 is customarily a part of the unit 30, from which power may be supplied to auxiliary units. In mounting a seeder embodying the present invention on such a tractor, the mounting yoke 3 is bolted directly to the tractor, the seeder being mounted somewhat closer to the rear of the tractor. The power unit 30, which may be mounted in either vertical or horizontal position, is mounted with the pulley 31 in upright position. The distributor 23 is then mounted directly on the top of the pulley.

Both of the modifications operate in exactly the same manner as previously described in connection with Fig. 1, the structural details of the seeders being identical.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A tractor mounted broadcast seeder including a horizontally disposed rotary distributing disc divided over its entire face into quadrants formed by ribs, a seed hopper presenting a discharge opening in overlying relation to said disc, said opening being positioned forward of the center of the disc and nearer the rear end of the tractor than the center of the disc whereby when the disc is rotated the seed is distributd over a circular path except for a blind angle represented by the boundary of the tractor, means for adjustably rotating said hopper over a limited range to move said opening across said disc in a direction laterally of the tractor, said opening being confined within the two front quadrants of the rotary disc whereby different types of seed are accommodated and the distribution thereof over a limited circular path is maintained, and means operated independently of the opening-moving structure for controlling the size of the opening.

2. A tractor mounted broadcast seeder including a horizontally disposed rotary distributing disc divided by ribs into sectors, said ribs extending to the center of the disc, a seed hopper presenting a discharge opening in overlying relation to said disc, said opening being positioned out of coincidence with the center of the disc and located between the center of the disc and the forwardmost edge of the disc, whereby when the disc is rotated the seed is distributed over a circular path except for a blind angle represented by the boundary of the tractor, means for adjustably rotating said hopper over a limited range to move said opening across said disc in a direction lateral with respect to the tractor, brace means for reinforcing and flexibly supporting the hopper to permit said rotational movement of the hopper, said opening being confined to the two forward quadrants of the disc, and means operated independently of the opening-moving structure for controlling the size of the opening whereby the thickness of distribution of the seed over the limited broadcast angle is controlled.

3. A tractor mounted broadcast seeder including a horizontally disposed rotary distributing disc divided by ribs into sectors, said ribs extending to the center of the disc, a seed hopper presenting a discharge opening in overlying relation to said disc, said opening being positioned out of coincidence with the center of the disc and located between the center of the disc and the forwardmost edge of the disc, whereby when the disc is rotated the seed is distributed over a circular path except for a blind angle represented by the boundary of the tractor, means for adjustably rotating said hopper over a limited range to move said opening across said disc in a direction lateral with respect to the tractor, means including supports spaced at different heights along the hopper for supporting the hopper to permit said rotational movement of the hopper, said last mentioned means including a transversely extending arm and a slidable element connecting the hopper to said arm, said opening being confined to the two forward quadrants of the disc, and slidable means operated independently of the opening-moving structure for controlling the size of the opening whereby the thickness of distribution of the seed over the limited broadcast angle is controlled.

CHARLES E. WEEKS.

REFERENCES CITED

The following references are of record in the file of this patent:

UNITED STATES PATENTS

| Number | Name | Date |
|---|---|---|
| 492,920 | Hansson | Mar. 7, 1893 |
| 1,011,071 | Mehlberger | Dec. 5, 1911 |
| 1,291,882 | Hicks | Jan. 21, 1919 |
| 1,644,031 | Pulliam | Oct. 4, 1927 |
| 1,751,928 | Lachner | Mar. 25, 1930 |
| 1,753,811 | Stolle | Apr. 8, 1930 |
| 2,159,670 | Neitzke | May 23, 1939 |
| 2,162,689 | Mayfield | June 20, 1939 |
| 2,187,448 | Currivan et al. | Jan. 16, 1940 |
| 2,192,802 | Pound | Mar. 5, 1940 |
| 2,234,343 | Harrington | Mar. 11, 1941 |
| 2,334,376 | Bauer | Nov. 16, 1943 |
| 2,451,128 | Thiesse | Oct. 12, 1948 |
| 2,463,855 | Crawford | Mar. 8, 1949 |
| 2,489,171 | Balduf | Nov. 22, 1949 |
| 2,519,243 | Gjertson | Aug. 15, 1950 |